United States Patent
Carlson et al.

(10) Patent No.: US 11,776,778 B1
(45) Date of Patent: Oct. 3, 2023

(54) INDUSTRIAL CIRCUIT BREAKER

(71) Applicant: Rockwell Automation Technologies, Inc.

(72) Inventors: Andrew E. Carlson, Franklin, WI (US); Kyle B. Adkins, Oak Creek, WI (US)

(73) Assignee: ROCKWELL AUTOMATION TECHNOLOGIES, INC., Mayfield Heights, OH (US)

(*) Notice: Subject to any disclaimer, the term of this patent is extended or adjusted under 35 U.S.C. 154(b) by 0 days.

(21) Appl. No.: 17/662,589

(22) Filed: May 9, 2022

(51) Int. Cl.
*H01H 9/00* (2006.01)
*H01H 33/02* (2006.01)
*H01H 33/59* (2006.01)
*H01H 71/70* (2006.01)

(52) U.S. Cl.
CPC .......... *H01H 33/59* (2013.01); *H01H 9/0072* (2013.01); *H01H 33/022* (2013.01); *H01H 33/027* (2013.01); *H01H 71/70* (2013.01)

(58) Field of Classification Search
CPC .... H01H 33/59; H01H 33/022; H01H 33/027; H01H 9/0072; H01H 9/541; H01H 9/542; H01H 9/563; H01H 2009/566; H01H 71/70; H01H 71/7445; H01H 33/593; H01H 33/596; H02H 3/00; H02H 7/00
USPC ............ 200/237; 315/146, 314; 361/83, 159
See application file for complete search history.

(56) References Cited

U.S. PATENT DOCUMENTS

| | | | | |
|---|---|---|---|---|
| 4,219,759 A * | 8/1980 | Hirschfeld | ............. | H01F 29/02 |
| | | | | 315/307 |
| 4,333,119 A * | 6/1982 | Schoenmeyr | ............ | H02H 7/09 |
| | | | | 361/76 |
| 7,075,764 B2 * | 7/2006 | Wahlroos | ................. | H01H 9/56 |
| | | | | 361/63 |
| 7,508,638 B2 * | 3/2009 | Hooper | .................. | H02H 5/105 |
| | | | | 361/42 |
| 7,741,937 B2 * | 6/2010 | Mori | .................... | H01H 33/593 |
| | | | | 335/8 |
| 8,493,012 B2 * | 7/2013 | Kellis | .................. | H02H 7/0816 |
| | | | | 361/23 |
| 8,879,218 B2 * | 11/2014 | Tomimbang | ......... | H02H 1/0015 |
| | | | | 361/42 |
| 9,082,562 B2 * | 7/2015 | Kinoshita | ............. | H01H 9/563 |
| 9,912,156 B2 * | 3/2018 | Couture | ................ | H01H 33/66 |
| 10,396,689 B2 * | 8/2019 | Jaap | ....................... | H02K 11/26 |
| 10,424,912 B2 * | 9/2019 | Yamamoto | ............ | H02H 9/002 |
| 2020/0312592 A1 * | 10/2020 | Lindell | .................. | H02H 3/021 |

* cited by examiner

*Primary Examiner* — William A Bolton

(57) ABSTRACT

A circuit breaker includes two or more poles electrically connected between a power supply and a contactor. Each of the two or more poles comprises a switch. The circuit breaker includes one or more voltage measuring devices configured to measure at least one phase-to-phase voltage level, and one or more current detecting devices configured to detect current going through each of the two or more poles. The circuit breaker further includes a control circuitry configured to: monitor the at least one phase-to-phase voltage level; in response to determining the at least one phase-to-phase voltage level is within a threshold range, close corresponding switches; in response to detecting current flowing through at least one of the two or more poles, maintain the corresponding switches in a closed position; and close all additional switches associated with the two or more poles after a period of time.

15 Claims, 4 Drawing Sheets

INDUSTRIAL CIRCUIT BREAKER

BACKGROUND

The present disclosure relates generally to systems and methods for circuit breakers used within industrial automation systems. More specifically, the present disclosure relates to solid-state circuit breakers used within industrial automation systems.

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

An industrial automation system may include a variety of components associated with different types of motors and motor-drive configurations. For example, different motor-drive configurations may use different types of protection and electrical isolation systems to protect various electrical components connected to a motor-drive system from certain overvoltage and/or overcurrent situations. To effectively protect and operate a variety of types of motors and electrical systems in an industrial automation system, circuit breakers may be included between an electrical load (e.g., a motor) and a power supply.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a circuit breaker includes two or more poles electrically connected between a power supply and a contactor. Each of the two or more poles comprises a switch configured to open to break and close to make an electrical connection between the power supply and the contactor. The circuit breaker also includes one or more voltage measuring devices configured to measure at least one phase-to-phase voltage level between two of the two or more poles. The circuit breaker also includes one or more current detecting devices configured to detect current going through each of the two or more poles. The circuit breaker further includes a control circuitry configured to: monitor the at least one phase-to-phase voltage level; in response to determining the at least one phase-to-phase voltage level is within a threshold range, close corresponding switches of the two of the two or more poles; in response to detecting current flowing through at least one of the two or more poles, maintain the corresponding switches in a closed position; and close all additional switches associated with the two or more poles after a period of time.

In another embodiment, an industrial system includes a power supply and a circuit breaking circuitry. The circuit breaking circuitry includes two or more poles electrically connected between a power supply and a contactor. Each of the two or more poles comprises a switch configured to open to break and close to make an electrical connection between the power supply and the contactor. The circuit breaking circuitry also includes one or more voltage measuring devices configured to measure at least one phase-to-phase voltage level between two of the two or more poles. The circuit breaking circuitry also includes one or more current detecting devices configured to detect current going through each of the two or more poles. The circuit breaking circuitry further includes a control circuitry configured to: monitor the at least one phase-to-phase voltage level; in response to determining the at least one phase-to-phase voltage level is within a threshold range, close corresponding switches of the two of the two or more poles; in response to detecting current flowing through at least one of the two or more poles, maintain the corresponding switches in a closed position; and close all additional switches associated with the two or more poles after a period of time.

In another embodiment, a method includes: measuring at least one phase-to-phase voltage level between two of two or more poles, wherein the two or more poles are electrically connected between a power supply and a contactor, wherein each of the two or more poles comprises a switch configured to open to break and close to make an electrical connection between the power supply and the contactor; detecting a presence of current through the two or more poles; in response to determining that the at least one phase-to-phase voltage level is within a threshold range, closing corresponding switches of the two of the two or more poles; in response to detecting current flowing through at least one of the two or more poles, maintaining the corresponding switches in a closed position; and closing all additional switches associated with the two or more poles after a period of time.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

The present disclosure relates to an industrial circuit breaker that is designed with fast switching capabilities for an industrial system. Electrical contactors are used in the industrial system to connect a power supply to a load when they close and disconnect the power supply from the load when they open. The electrical contactors bounce when the contactors are closing. The bouncing under load creates arcing which can degrade contacts life and increase the probability of welding. The industrial circuit breaker provided in the present disclosure can be applied between the contactors and the power supply to minimize the bouncing in order to reduce or eliminate the arcing phenomenon when the contactors are closing. In this way, the industrial circuit breaker can extend the electrical endurance life of the contactors downstream. The industrial circuit breaker can also be utilized in an industrial system to reduce induction motor start-up torque, reduce inrush current for induction motors, and/or reduce inrush current for capacitive load switching.

Figure 1:
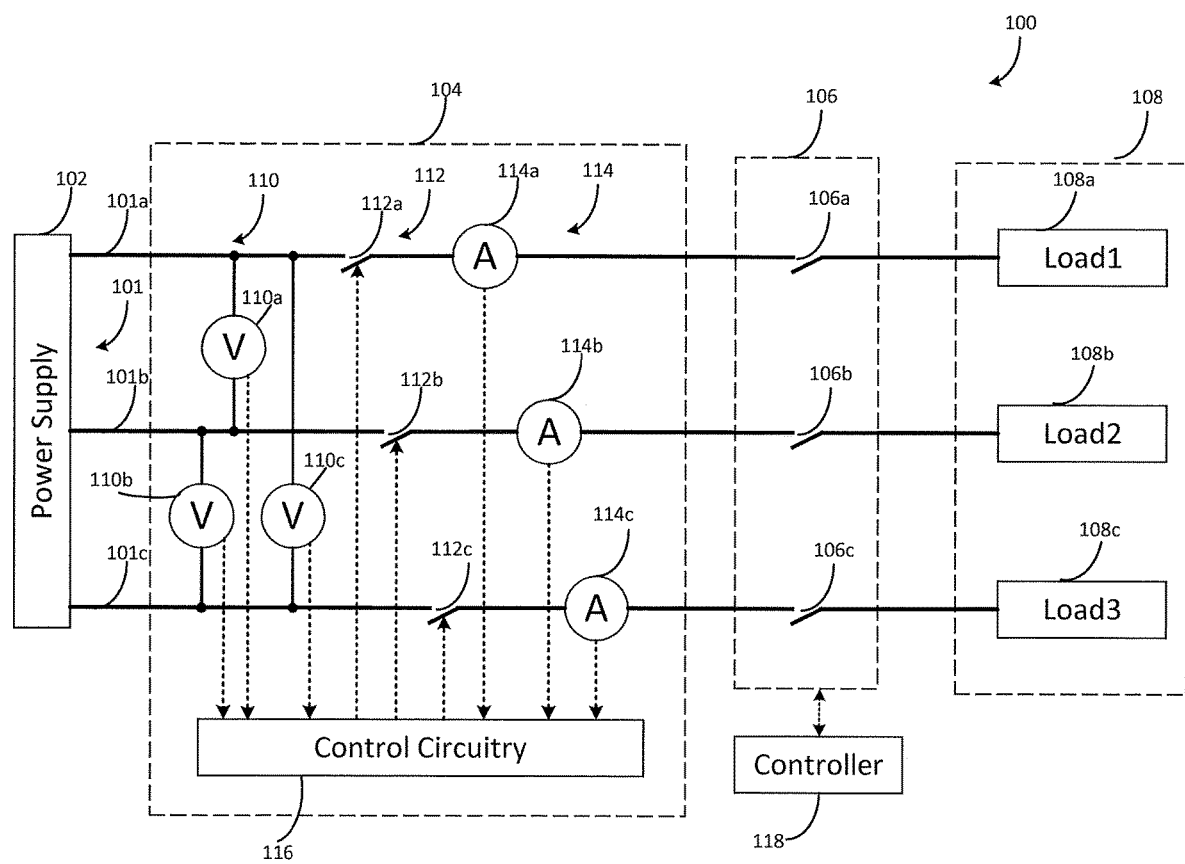
FIG. 1 is a circuit diagram of an industrial system in accordance with an embodiment described herein.

FIG. 1 is a circuit diagram of an industrial system 100. The industrial system 100 includes at least two poles 101, a power supply 102, a circuit breaker 104 (e.g., including one or more voltage measuring devices 110, a switch 112 on each pole 101, one or more current detecting devices 114, and a control circuitry 116), a contactor 106, a load 108, and a controller 118. The power supply 102, the circuit breaker 104, the contactor 106, and the load 108 are electrically connected in series. The switch may be any type switching devices, such as a relay, contactor, solid state device, etc. The industrial system 100 controls power supply to the load 108 through controlling the contactors 106 by the controller 118. The circuit breaker 104 is used to protect the load 108 from damage during abnormal operations. For example, when a voltage or current that is uncharacteristically high or low is delivered from the power supply 102 to the load 108, the circuit breaker 104 may electronically disconnect the power supply 102 from the load 108. The circuit breaker 104 is also configured to self-controlled open/close based on a voltage level and a current level within the circuit breaker to minimize the bouncing phenomenon when the contactor is closing.

The power supply 102 may be provided by any suitable power sources, such as, a three-phase alternating current (AC) power source, a single-phase AC power source, etc. The at least one pole 101 may include three poles 101a, 101b, and 101c. Each pole 101 connects to a phase pole of the power supply 102. In some implementations, the circuit breaker 104 is not limited to three poles. For example, if the power supply 102 is a single phase power source, the circuit breaker 104 may include two poles. In some exemplary implementations, the power supply 102 is provided according to the type of the load 108. For example, for a three-phase load 108 (e.g., including a first phase load 108a, a second phase load 108b, and a third phase load 108c), the power supply 102 may provide three-phase power.

The circuit breaker 104 may be a solid state circuit breaker. In some implementations, the circuit breaker 104 may be any suitable type of circuit breaker. At each pole 101, the circuit breaker 104 includes a switch 112 connecting between a corresponding phase of the power supply 102 and a corresponding contact of the contactor 106. The switch 112 can be any suitable switching device configured to open to break and close to make an electrical connection between the power supply 102 and the contactor 106. The circuit breaker 104 includes the one or more voltage measuring devices 110 for measuring a phase-to-phase voltage level between any two poles 101 and one or more current detecting devices 114 for detecting current going through each pole 101. The one or more voltage measuring devices 110 may include any suitable voltage meters and voltage measuring means that can measure phase-to-phase voltages. The one or more current detecting devices 114 may include any suitable current meters and current detecting/measuring means.

In an exemplary implementation as shown in FIG. 1, the circuit breaker 104 includes a first voltage measuring device 110a for measuring a first phase-to-phase voltage level between the first pole 101a and the second pole 101b, a second voltage measuring device 110b for measuring a second phase-to-phase voltage level between the second pole 101b and the third pole 101c, and a third voltage measuring device 110c for measuring a third phase-to-phase voltage level between the first pole 101a and the third pole 101c. The circuit breaker 104 also includes a first current detecting device 114a for detecting current going through the first pole 101a, a second current detecting device 114b for detecting current through the second pole 101b, and a third current detecting device 114c for detecting current through the third pole 101c.

The control circuitry 116 is configured to receive voltage levels and current detection signals from the one or more voltage measuring devices 110 and the one or more current detecting devices 114. The control circuitry 116 is further configured to generate control signals to control the open/close operations of the switches 112. In some implementations, the circuit breaker 104 may include two voltage measuring devices for measuring two voltage levels between the corresponding poles. In these implementations, the control circuitry 116 may calculate a third voltage level based on the two measured voltage levels. The control circuitry 116 may be independent from the controller 118. The control circuitry 116 may control the switches 112 independently from the controller 118 that controls the open/close operations of the contactor 106. In some exemplary implementations, the control circuitry 116 may be outside of the circuit breaker 104.

In some implementations, the one or more voltage measuring devices 110 are configured to continuously collect phase-to-phase voltage levels and transmit the voltage levels to the control circuitry 116 in real time. The control circuitry 116 is configured to monitor the received phase-to-phase voltage levels and determine whether any of the phase-to-phase voltage levels fall within a predetermined threshold voltage range. For example, the control circuitry 116 receive the first, second, and third phase-to-phase voltage levels in real time. The control circuitry 116 then determines whether each of the first, second, and third phase-to-phase voltage levels fall within the threshold range (e.g., [−2V, +2V]). In response to determining that one or more phase-to-phase voltage values fall within the threshold range, the control circuitry 116 sends control signals to close the corresponding switches 112. The control circuitry 116 then continuously monitors the corresponding voltage levels. In response to determining that the corresponding voltage levels are out of the threshold range, the control circuitry 116 sends control signals to open the corresponding switches 112. In this way, the switches are open or closed according to the change of the phase-to-phase values.

For example, in response to determining that the first phase-to-phase voltage level (e.g., measured from the first voltage measuring device 110a) is within the threshold range, the control circuitry 116 closes the first switch 112a on the first pole 101a and closes the second switch 112b on the second pole 101b. Similarly, in response to determining that the second phase-to-phase voltage level (e.g., measured from the first voltage measuring device 110a) is within the threshold range, the control circuitry 116 closes the third switch 112c on the third pole 101c and closes the second switch 112b on the second pole 101b. In response to determining that the first phase-to-phase voltage value is out of the threshold range, the control circuitry 116 sends control signals to open the first switch 112a. In response to determining that the second phase-to-phase voltage value is out of the threshold range, the control circuitry 116 sends control signals to open the second switch 112b.

The control circuitry 116 is also configured to continuously monitor current going through each pole 101 by monitoring the detecting signals from the one or more current detecting devices 114. In response to detecting current going through one or more poles 101, the control circuitry 116 sends control signals to instruct the respective switches 112 on the one or more poles 101 to remain closed and instruct, after predetermined period of time, the other switches on the other poles to be closed. In this way, the switches 112 do not close at the same time and no current is going through all the contacts of the contactor 106 at the same time, so that the arcing phenomenon on the contactor may be reduced or eliminated. For example, when the first current detecting device 114a detects a current going through the first pole 101a, the control circuitry 116 determines that the contactor 106 is closed. In response to determining that the contactor 106 is closed, the control circuitry 116 sends instructions to the switches that are already closed to remain closed and to the switches that are open to be closed after a period of time. In some alternative implementations, in response to determining that the contactor 106 is closed, the control circuitry 116 sends instructions to the switches that are already closed to remain closed and waits for a period of time to send instructions to the other switches to be closed.

Figure 2:
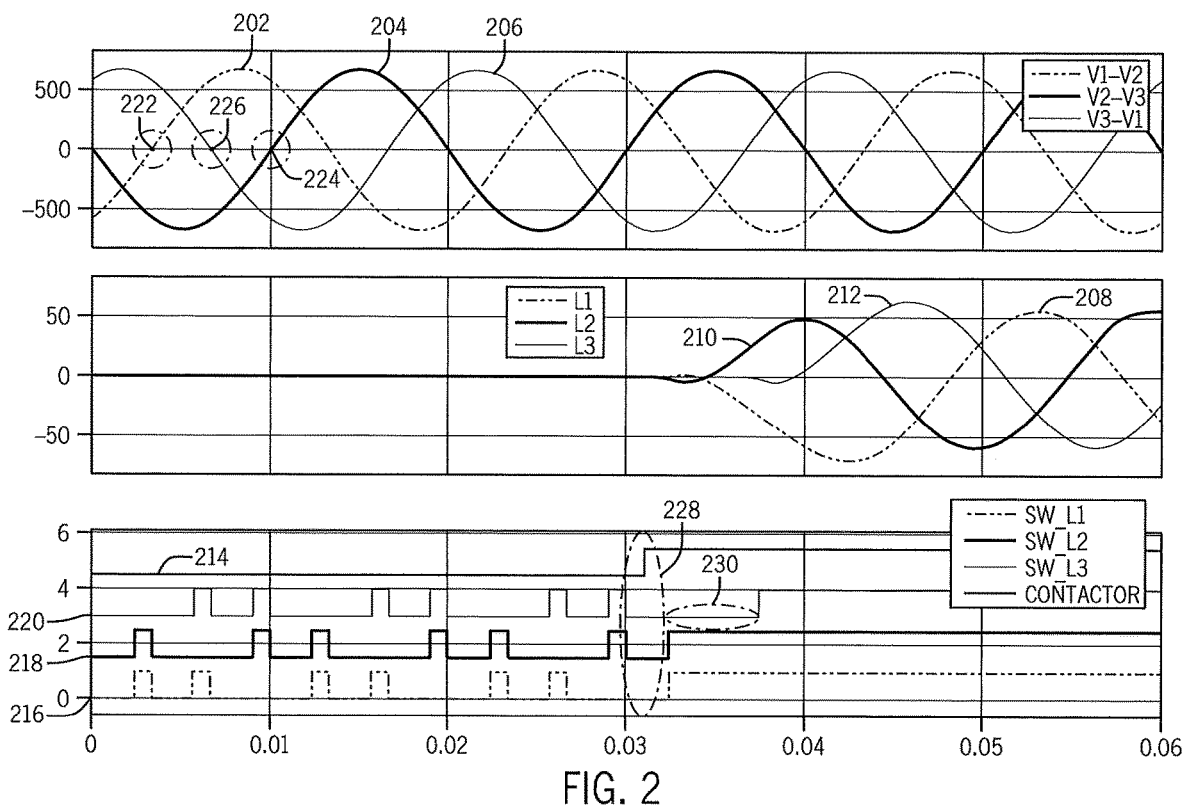
FIG. 2 is a diagram illustrating operating stages of a three-phase circuit breaker based on voltage and current levels in accordance with an embodiment described herein.

FIG. 2 is a diagram illustrating operating stages of a three-phase circuit breaker based on voltage and current levels. The circuit breaker is similar to the circuit breaker 104 of FIG. 1. The circuit breaker is connected between a three-phase power supply and a contactor. The circuit breaker includes three poles. Each pole includes a switching device (e.g., relay). Each pole is connected to a phase of the power supply. A phase-to-phase voltage level is monitored between each two poles by the circuit breaker 104. Each phase-to-phase voltage is represented by a sine wave as shown in FIG. 2. For example, a first phase-to-phase voltage 202 is measured and monitored between a first and second pole. A second phase-to-phase voltage 204 is measured and monitored between the second and third poles. A third phase-to-phase voltage 206 is measured and monitored between the first and the third poles. When a phase-to-phase voltage is within a threshold range (e.g., a voltage range around zero 222, 224, 226), the circuit breaker closes the switching devices on the corresponding poles. When the phase-to-phase voltage is out of the threshold range, the circuit breaker opens the switching devices.

In some exemplary implementations, the threshold range includes phase-to-phase voltages around zero. For example, when the first phase-to-phase voltage 202 (e.g., voltage level between the first and second poles) is within a first threshold range 222, the first switching device 216 of the first pole and the second switching device 218 of the second pole are closed. When the first phase-to-phase voltage is out of the first threshold range 222, the first switching device 216 and the second switching device 218 are switched back to open. Similarly, when the second phase-to-phase voltage 204 (e.g., voltage level between the second and third poles) is within a second threshold range 224, the second switching device 218 of the second pole and the third switching device 220 of the third pole are closed. When the second phase-to-phase voltage is out of the second threshold range 224, the second switching device 218 and the third switching device 220 are switched back to open. Similarly, when the third phase-to-phase voltage 206 (e.g., voltage level between the first and third poles) is within a third threshold range 226, the first switching device 216 of the first pole and the third switching device 220 of the third pole are closed. When the third phase-to-phase voltage is out of the third threshold range 226, the first switching device 216 and the third switching device 220 are switched back to open. The first, second, and the third threshold ranges may be the same or different. The circuit breaker continuously controls the open/close operations of each switching device based on the corresponding phase-to-phase voltage.

When the circuit breaker determines that the contactor 214 is closed, the circuit breaker closes all the switching devices in sequence. In other words, the circuit breaker does not close all the switching devices at the same time to reduce or eliminate arcing phenomenon on the downstream contactor 214. In some implementations, the circuit breaker may determine that the contactor 214 is closed by detecting a current going through at least one of the three poles. In some other implementations, the circuit breaker may determine that the contactor 214 is closed by receiving indications from the contactor 214 or other controllers in the industrial system. Once the contactor 214 is determined to be closed, the circuit breaker determines whether there are any switching devices currently closed. Upon determining no switching devices are currently closed (e.g., as shown in the area 228 where the contactor is closed, and all switching devices are open), the circuit breaker waits for the next phase-to-phase voltage (e.g., the first phase-to-phase voltage level 202) falling within the threshold range, and then closes the corresponding two switching devices (e.g., the first and second switching devices 216 and 218) and does not switch the switching device back to open even when the phase-to-phase voltage level is out of the threshold range. After a predefined period of time (e.g., as shown in the area of 230) of closing the corresponding two switching devices, the circuit breaker closes the last switching device (e.g., the third switching device 220).

Figure 3:
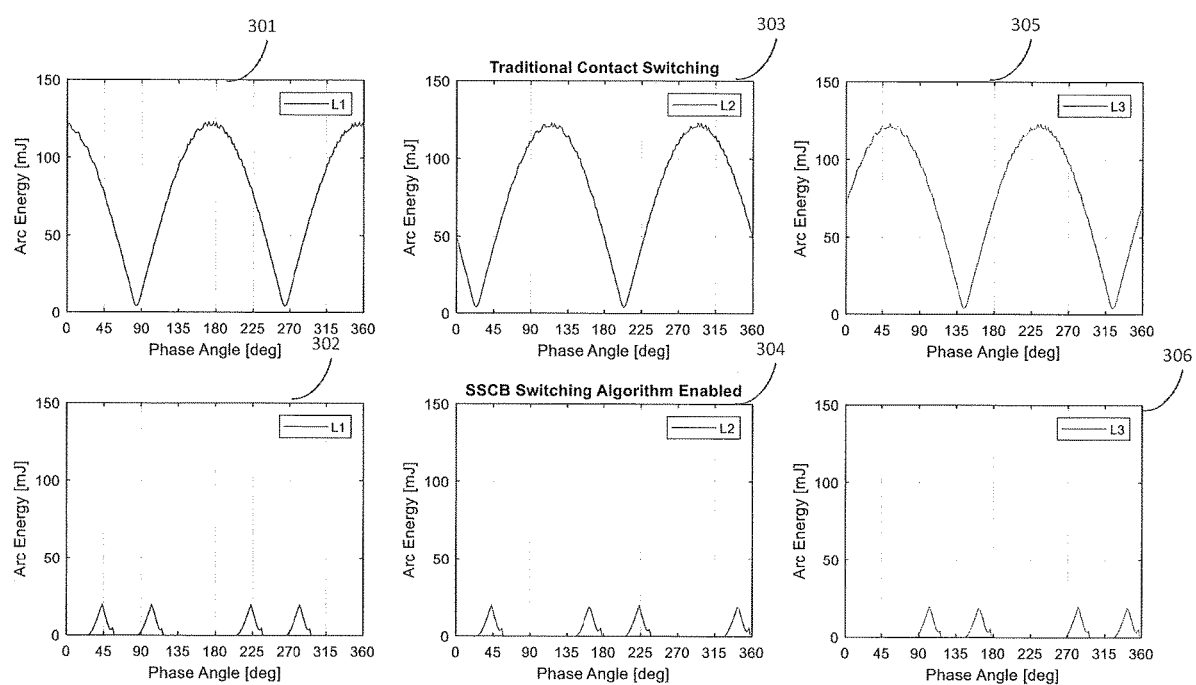
FIG. 3 is a diagram illustrating the arc energy analysis of the contactor by implementing the operations of the circuit breaker of FIG. 2 in accordance with an embodiment described herein.

FIG. 3 illustrates the arc energy profiles of the contactor 106 by implementing the operations of the circuit breaker 104 of FIG. 1. For the first phase, the arc energy generated from traditional circuit breakers 301 may be larger (e.g., 96.1%) than the circuit breaker 104. For the second and third phase angles, similar results show that the circuit breaker 104 significantly reduces the arc energy compared to the traditional circuit breakers (e.g., profile 303 v. profile 304, profile 305 v. profile 306).

Figure 4:
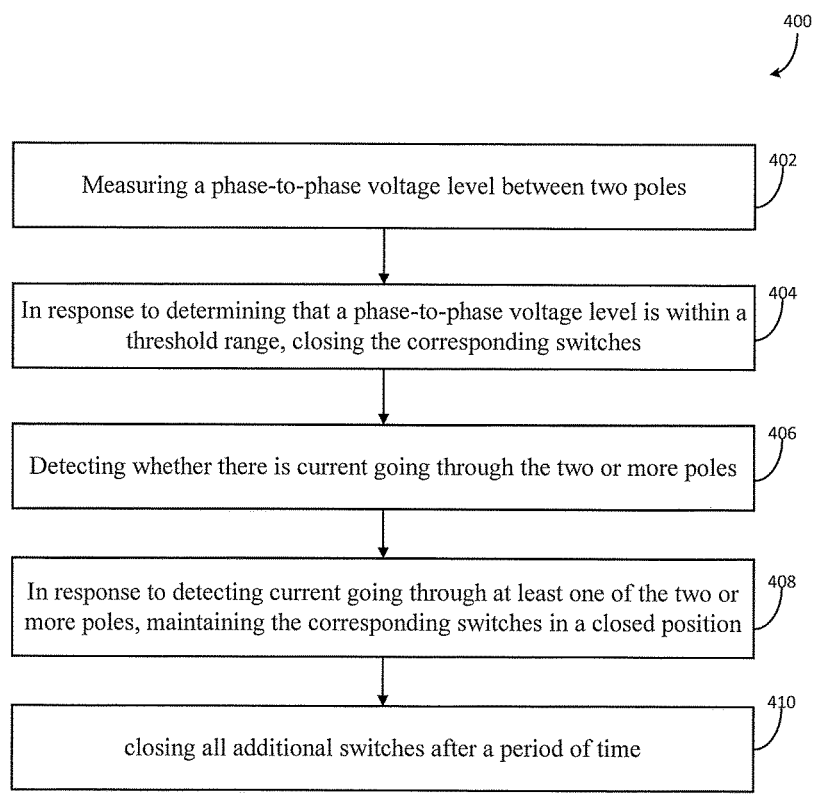
FIG. 4 is a flow chart of a method for operating switches in a sequential manner within a circuit breaker to reduce arc energy on a downstream contactor in accordance with an embodiment described herein.

FIG. 4 is a flow chart of a method 400 for operating switches in a sequential manner within a circuit breaker to reduce arc energy on a downstream contactor. The method may be performed using the circuit breaker of FIG. 1. At step 402, a phase-to-phase voltage level is measured between two of the two poles of two or more poles. The two or more poles are electrically connected between a power supply and a contactor in parallel. Each pole includes a switch configured to open to break and close to make an electrical connection between the power supply and the contactor. A phase-to-phase voltage level may be calculated by one or more measured phase-to-phase voltage levels. For example, for a three-phase circuit breaker that includes three poles, upon receiving a first phase-to-phase voltage level between a first one of the two or more poles and a second one of the two or more poles, and a second phase-to-phase voltage level between the second one of the two or more poles and a third one of the two or more poles, a third phase-to-phase voltage level between the first one of the two or more poles and the third one of the two or more poles may be determined based on the first phase-to-phase voltage level and the second phase-to-phase voltage level. In some implementations, the phase-to-phase voltage levels may be measured by one or more voltage measuring devices connected within the circuit breaker. In some other implementations, the phase-to-phase voltage levels may be determined by some devices outside of the circuit breaker and transmitted to the circuit breaker.

At step 404, in response to determining that a phase-to-phase voltage level is within a threshold range, the circuit breaker closes the corresponding switches. The threshold range may be predetermined based on type and/or operational characteristics of the circuit breaker and the downstream contactor.

At step 406, the circuit breaker may determine whether there is current going through any of the two or more poles. The circuit breaker may determine the current by one or more current detecting devices within the circuit breaker or by receiving the current detection signal from devices outside of the circuit breaker. In some exemplary implementations, a current may be determined by measured current on one or more poles. For example, a three-phase circuit breaker that includes three poles, upon receive a first current going through a first pole of the two or more poles and a second current going through a second pole of the two or more poles, a third current going through a third pole of the two or more poles may be determined based on the first current and the second current.

At step 408, in response to detecting current going through at least one of the two or more poles, the circuit breaker maintains the corresponding switches in a closed position In some implementations, the circuit breaker maintains the corresponding switches in a closed position by not sending open signals to the corresponding switches even when the corresponding phase-to-phase voltage level is out of the threshold range.

At step 410, the circuit breaker closes all additional switches after a period of time. The period of time is determined based on the last phase(s) to close. For example, the period of time may be determined based on the frequency of the power supply. For example, for a 50 Hz phase, the period of time may be 5 ms.

In some exemplary implementations, once the circuit breaker determines that the contactor is closed and one or more switching devices are currently closed, the circuit breaker keeps the one or more switching devices closed and does not open the one or more switching devices even if the corresponding phase-to-phase voltage level is out of the threshold range. Upon determining that that the contactor is closed and the one or more switching devices are currently closed, the circuit breaker closes the remaining switching devices after the period of time.

It should also be noted that while some embodiments described herein are detailed with reference to a particular relay device or contactor described in the specification, it should be understood that these descriptions are provided for the benefit of understanding how certain techniques are implemented. Indeed, the systems and methods described herein are not limited to the specific devices employed in the descriptions above.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A circuit breaker, comprising:
two or more poles electrically connected between a power supply and a contactor, wherein each of the two or more poles comprises switches configured to open to break and close to make an electrical connection between the power supply and the contactor;
one or more voltage measuring devices configured to measure at least one phase-to-phase voltage level between two of the two or more poles;
one or more current detecting devices configured to detect current going through each of the two or more poles; and
a control circuitry configured to:
monitor the at least one phase-to-phase voltage level;
in response to determining the at least one phase-to-phase voltage level is within a threshold range, close corresponding switches of the two of the two or more poles;
in response to detecting current flowing through at least one of the two or more poles, maintain the corresponding switches in a closed position; and
close any remaining switches of the switches associated with the two or more poles after a period of time,
wherein the control circuitry is further configured to:
receive a first current going through a first pole of the two or more poles;
receive a second current going through a second pole of the two or more poles; and
determine a third current going through a third pole of the two or more poles based on the first current and the second current.

2. The circuit breaker of claim 1, wherein the control circuitry is further configured to open the corresponding switches when the at least one phase-to-phase voltage level is out of the threshold range and when no current is flowing through the two or more poles.

3. The circuit breaker of claim 1, wherein the power supply supplies three-phase electric power.

4. The circuit breaker of claim 1, wherein the control circuitry receives the phase-to-phase voltage levels from the one or more voltage measuring devices continuously.

5. The circuit breaker of claim 1, wherein the control circuitry sends control signals to control open and close operations of the corresponding switches.

6. An industrial system, comprising the power supply and the circuit breaker of claim 1.

7. A method, comprising:
measuring at least one phase-to-phase voltage level between two or more poles, wherein the two or more poles are electrically connected between a power supply and a contactor, wherein each of the two or more poles comprises a switch configured to open to break and close to make an electrical connection between the power supply and the contactor;
detecting a presence of current through the two or more poles;
in response to determining that the at least one phase-to-phase voltage level is within a threshold range, closing corresponding switches of the two or more poles;
in response to detecting current flowing through at least one of the two or more poles, maintaining the corresponding switches in a closed position;
closing any remaining switches of the switches associated with the two or more poles after a period of time;
receiving a first phase-to-phase voltage level between a first one of the two or more poles and a second one of the two or more poles;
receiving a second phase-to-phase voltage level between the second one of the two or more poles and a third one of the two or more poles; and
determining a third phase-to-phase voltage level between the first one of the two or more poles and the third one of the two or more poles based on the first phase-to-phase voltage level and the second phase-to-phase voltage level.

8. The method of claim 7, further comprising opening the corresponding switches when the at least one phase-to-phase voltage level is out of the threshold range and when no current is going through the two of more poles.

9. The method of claim 7, further comprising calculating an additional phase-to-phase voltage level based on a plurality of phase-to-phase voltage levels measured by the one or more voltage measuring devices.

10. A circuit breaker, comprising:
two or more poles electrically connected between a power supply and a contactor, wherein each of the two or more poles comprises a switch configured to open to break and close to make an electrical connection between the power supply and the contactor;
one or more voltage measuring devices configured to measure at least one phase-to-phase voltage level between two of the two or more poles;
one or more current detecting devices configured to detect current going through each of the two or more poles; and
a control circuitry configured to:
monitor the at least one phase-to-phase voltage level;
in response to determining the at least one phase-to-phase voltage level is within a threshold range, close corresponding switches of the two of the two or more poles;
in response to detecting current flowing through at least one of the two or more poles, maintain the corresponding switches in a closed position; and
close all additional switches associated with the two or more poles after a period of time,
wherein the control circuitry is further configured to:
receive a first phase-to-phase voltage level between a first one of the two or more poles and a second one of the two or more poles;
receive a second phase-to-phase voltage level between the second one of the two or more poles and a third one of the two or more poles; and
determine a third phase-to-phase voltage level between the first one of the two or more poles and the third one of the two or more poles based on the first phase-to-phase voltage level and the second phase-to-phase voltage level.

11. The circuit breaker of claim 10, wherein the control circuitry is further configured to open the corresponding switches when the at least one phase-to-phase voltage level is out of the threshold range and when no current is flowing through the two or more poles.

12. The circuit breaker of claim 10, wherein the power supply supplies three-phase electric power.

13. The circuit breaker of claim 10, wherein the control circuitry receives the phase-to-phase voltage levels from the one or more voltage measuring devices continuously.

14. The circuit breaker of claim 10, wherein the control circuitry sends control signals to control open and close operations of the corresponding switches.

15. An industrial system, comprising the power supply and the circuit breaker of claim 10.

* * * * *